Feb. 9, 1937. H. G. ENGEL 2,070,425
DISK PLOW
Filed Sept. 30, 1935
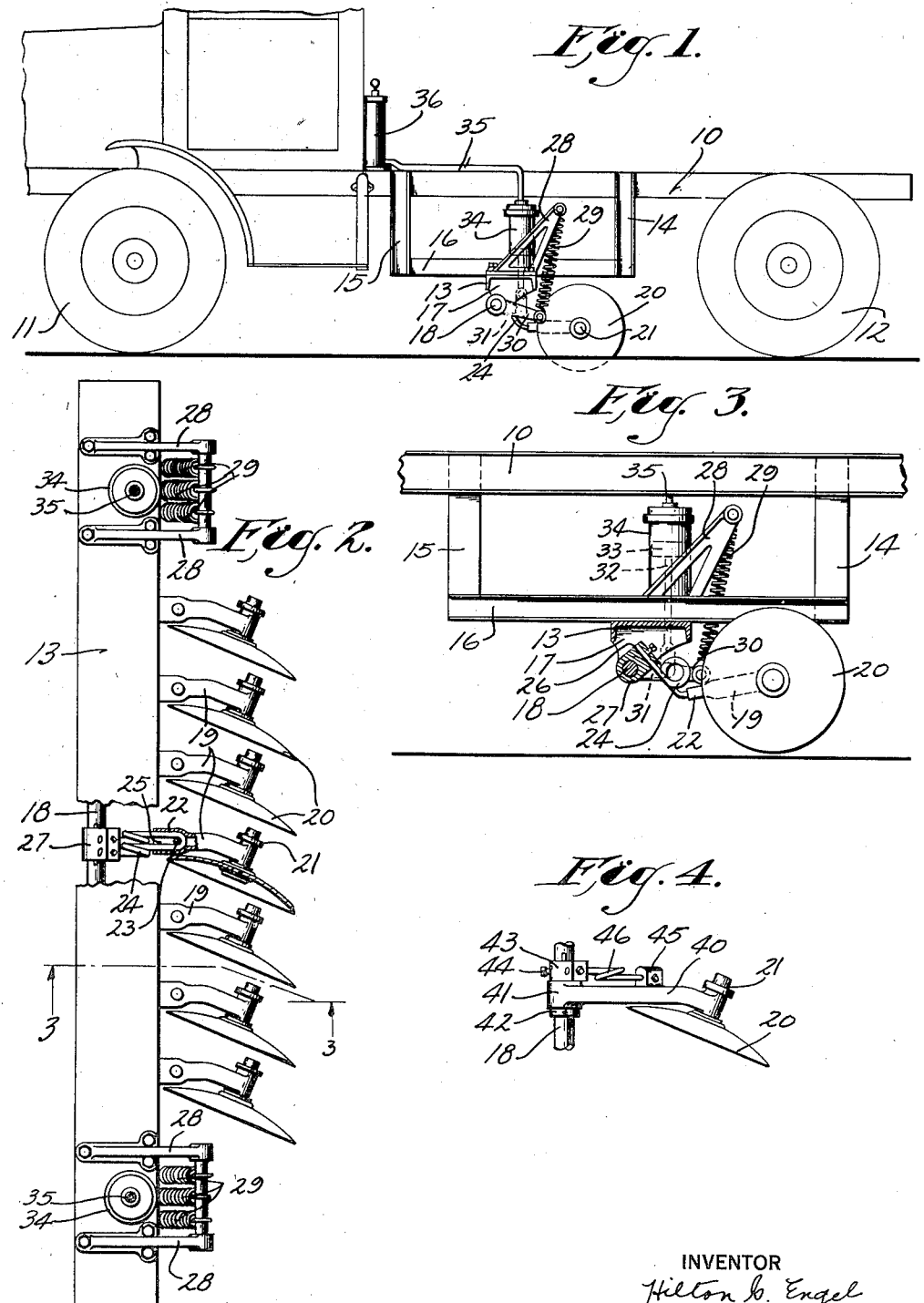
INVENTOR
Hilton G. Engel
BY Wheeler, Wheeler & Wheeler
ATTORNEYS Patented Feb. 9, 1937

2,070,425

UNITED STATES PATENT OFFICE 2,070,425

DISK PLOW

Hilton G. Engel, Indianapolis, Ind., assignor to The Four Wheel Drive Auto Company, Clintonville, Wis., a corporation of Wisconsin Application September 30, 1935, Serial No. 42,730

4 Claims. (Cl. 97—53)

My invention relates to an improvement in disk plows.

The object of my invention is to provide a new mounting for plow disks with respect to a plow frame and to so support a disk plow beneath a vehicle as to permit of easy control of the plow.

Another object of my invention is to provide a disk plow attachment for an automotive vehicle and to so mount the individual disks of the plows with respect to a cross frame or shaft as to permit individual vertical movement of the disks as a factor of safety in the operation of the entire gang, and to provide, with respect to the mounting of the entire gang of disks, a simple but effective control mechanism for applying the disks to their work or retracting the entire gang completely from working position.

In the drawing:

Figure 1 is a side elevation of an automotive vehicle provided with my improved disk plow attachment.

Figure 2 is a plan view of the disk plow gang attachment and the supporting frame therefor, a portion of the frame being broken away to show the cross shaft and an individual disk mounting.

Figure 3 is a section on line 3—3 of Figure 1.

Figure 4 is a plan view of an alternative form of individual disk mounting upon the cross shaft.

Like parts are designated by the same reference characters throughout the several views.

In the drawing I have shown my disk plow attachment installed in conjunction with an automotive vehicle comprising a commercial truck in which 10 is the main frame supported by wheels 11 and 12 preferably between which my disk plow is attached to and supported by the frame 10.

The main structural element of my disk plow attachment is a channeled beam 13 positioned transversely of and beneath the frame 10 from which the channel 13 is supported by frame work at either side of the frame 10 comprising vertical struts 14 and 15 and horizontal stretchers 16. The vertical struts 14 and 15 are of sufficient length in view of the diameter of the supporting wheels 11 and 12 to position the gang of disks at the proper height.

Gusset plates 17 at intervals of spacing along the channel 13 provide apertured ears through which a cross shaft 18 is positioned for oscillation. It is upon this oscillatable shaft 18 that the various arms which support the plow disks are mounted.

Arms 19 upon which the individual plow disks 20 are journaled for rotation at 21 are shaped as shown at 22 in Figure 2 to receive the looped end of a double convoluted spring member 24. A pin 23 extending through the arm 19 holds the spring 24 positively within the socket 25 in the end of arm 19. The other end of the spring 24 is received at 26 in a collar 27 keyed to shaft 18 with which the collar 27, spring 24, arm 19 and disk 20 are forced to oscillate under the control of mechanism now to be described.

For the purpose of raising the entire gang of disks 20, I provide brackets 28 for the support of the upper ends of springs 29 which extend downwardly to lifting arms 30 keyed to shaft 18 which therefore, unless restrained by other means, is forced to oscillate under the influence of springs 29 to lift the entire gang of disks.

Counteracting the effect of the springs 29, I provide means for forcing the gang of disks downwardly to hold them to their work, such means include a power crank arm 31 keyed to the shaft 18 and provided at the outer end of such crank arm 31 with a connection to a piston rod 32 extending to a piston 33 in cylinder 34. A fluid connection through pipe 35 and a force pump 36 is in the control of the operator of my improved disk plow attachment. Fluid pressure upon the piston 33 forces an oscillation of the power crank rod 31 and the shaft 18 to thrust the disks into the surface which supports the automotive vehicle to which my attachment is applied.

Particular attention is directed to the mounting of the arms 19 with respect to the shaft 18 and the collars 27. By means of the spring 24 provision is made for adjustment of individual disks. This adjustment is extremely useful where an individual disk encounters an obstruction which does not apply to its adjacent disks. This is a particularly advantageous novel construction especially useful where an attachment of the type above described is secured to an extremely heavy automotive vehicle. The ordinary plow frame and mechanism, although heavily built, is not at all comparable in weight to that of an automotive vehicle, and whereas the usual gang plow may lift in its entirety to relieve stresses induced by obstructions which strike only one or two disks, it would be virtually prohibitive to provide strength of materials in a single disk plow and supporting arm which would be capable of elevating the entire automotive vehicle and gang plow attachment if an obstruction was struck by a single disk. I have therefore in my improved disk plow attachment, provided means in the novel disk mounting between the shaft 18 and the disk 20 itself, for a resilient operation of the disk which thereby affords a factor of safety in the operation of the entire gang attachment.

In Figure 4 I have shown an alternative form of individual disk mounting from the shaft 18, whereby I not only secure the resilience and factor of safety referred to above, but also provide rigidity for the accomplishment of the actual plowing operation to be performed by the disk 20. In this alternative construction, I provide a rigid arm 40 journaled for free oscillation at 41 about the shaft 18 and I provide a collar 42 integral with the shaft 18. A spring clamp fitting 43 is keyed to the shaft 18, and provided with a set screw 44 to prevent axial movement of the arm 40 and the clamp 43 with respect to the shaft 18.

At 45 on the arm 40 I provide a boss and between this boss and the clamp 43, I provide a spring 46.

It will be apparent from the above description, with respect to the structure shown at Figure 4, that the arm 40 and its direct mounting upon the shaft 18 is such as to afford rigid resistance to virtually all stresses induced by the ordinary operation of the disk 20, but as to vertical movement of the disk under the stress of meeting an obstruction in the plowing operation, the spring 46 assumes the stress of purely vertical movement to provide the factor of safety referred to above.

I claim:

1. In a disk plow gang, a plurality of individual disks individually journaled, each in a separate journal support, a frame member to which each of the journal supports is attached and means comprising a resilient member for attaching said journal supports to the frame member, said means providing for resilient vertical movement of the journal support with respect to the frame and comprising the sole support for the journal.

2. A disk plow provided with an oscillatable cross shaft, a clamp fitting receivable upon the shaft for oscillation therewith, a single disk, and an arm resilient in a vertical direction between the disk and the fitting constituting the sole support for the disk.

3. A disk plow gang including a cross shaft and a plurality of plow disks resiliently mounted therefrom, a frame for support of the cross shaft, a lifting arm and a power crank arm extending from said shaft, means extending between the lifting arm and the frame whereby to oscillate the shaft to disk retracting position, and hydraulic means connected with the power crank arm for forcing oscillation of the shaft to disk operating position.

4. The combination with a vehicle provided with a main frame, of a cross shaft supported therefrom, a crank arm for said shaft, means attached to the arm for constantly urging the shaft in one direction of rotation, means connected to the shaft to rotate the shaft in another direction, and a series of plow disks each provided with an arm resilient in a vertical direction and secured to the shaft, whereby the disks in the series may severally be raised or lowered by said means, and said disks may be individually displaced in said vertical direction.

HILTON G. ENGEL.